June 26, 1951     W. W. EGEE     2,558,210
SPINNING SPINDLE

Filed July 30, 1949

*INVENTOR.*
WALTER WARREN EGEE
BY

ATTORNEY

Patented June 26, 1951

2,558,210

UNITED STATES PATENT OFFICE 2,558,210

SPINNING SPINDLE

Walter Warren Egee, Yeadon, Pa., assignor to Fletcher Works Incorporated, Philadelphia, Pa., a corporation of Pennsylvania Application July 30, 1949, Serial No. 107,778

5 Claims. (Cl. 57—130)

This invention relates to spinning spindles and more particularly to an improved mounting and bearing construction therefor.

It has heretofore been proposed to provide spindles with spaced pairs of ball bearings but most of these have not proven wholly satisfactory. Difficulty has been encountered in the assembly of the spindle. Under operating conditions failure results in a relatively short period of time. All the causes of the failure are not definitely ascertained, although eccentricity of the spindle seems to be a contributing factor.

It is the principal object of the present invention to provide an improved mounting and bearing construction for spinning spindles capable of operating for long periods of time without the necessity for lubrication.

It is a further object of the present invention to provide an improved spindle mounting and bearing construction utilizing stock types and sizes of ball bearings and with which improved operating characteristics are obtained.

It is a further object of the present invention to provide a spindle for spinning in which a plurality of spaced ball bearings are provided and in which one of the bearings is interposed in relatively rigid manner permitting rotation and in which the other ball bearing has associated therewith a resilient member permitting a limited flexing.

Other objects and advantageous features of the invention will be apparent from the specification and claims.

The nature and characteristic features of the invention will be more readily understood from the following description taken in connection with the accompanying drawings forming part hereof, in which.

Figure 2:
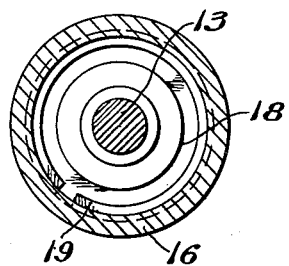
Fig. 2 is a horizontal sectional view taken approximately on the line 2—2 of Fig. 1.
Figure 1:
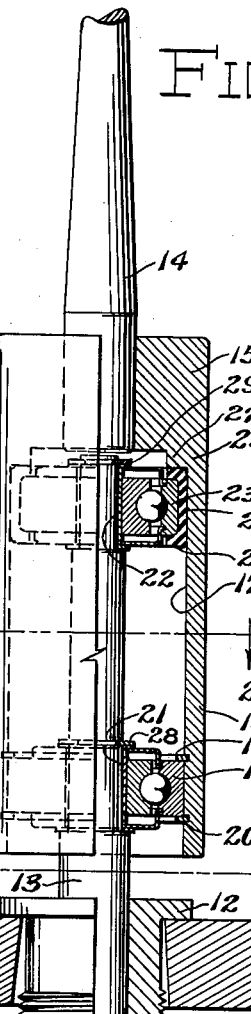
Figure 1 is a view in elevation of a spindle in accordance with the present invention parts being broken away to show the details of construction.
Figure 3:
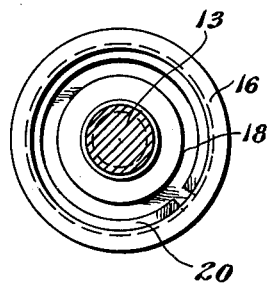
Fig. 3 is a horizontal sectional view taken approximately on the line 3—3 of Fig. 1.

It should, of course, be understood that the description and drawings herein are illustrative merely and that various modifications and changes can be made in the structure disclosed without departing from the spirit of the invention.

Like numerals refer to like parts throughout the several views.

Referring now more particularly to the drawings, in which a preferred embodiment of the invention is illustrated, a spindle rail or supporting frame member is shown at 10, through which a spindle base 11 extends, the base having a shoulder 12 in the usual manner. The base portion 11 has mounted therein an upwardly extending vertical stub shaft 13.

The spindle blade 14, which may be of any desired shape, is fixed in a whorl 15 having a downwardly extending cylindrical portion 16 for engagement by a driving belt (not shown) in engagement with the exterior cylindrical surface thereof. The interior of the extension 16 is preferably cylindrical, as at 17. Adjacent the lower portion of the whorl 15, a permanently lubricated and sealed lower ball bearing 18 is provided having its outer race in engagement with the interior surface 17 and having its interior race in engagement with a portion 21 of the stub shaft 13, of reduced diameter. The bearing 18 preferably has an internal fit referred to in the bearing industry as "loose." The bearing 18 may be retained in position on the stub shaft 13 by a lock ring 28.

The stub shaft 13 is retained in position in the interior of the whorl 15 in any desired manner to permit of the proper operation of the whorl. For this purpose it is preferred to provide a lower split ring 20 seated in the interior of the whorl 15 and engaging the lower face of the outer race of the bearing 18. An upper split ring 19 seated in the interior of the whorl 15 and engaging the upper face of the outer race of the bearing 18 may also be employed. The ring 20 aids in determining the positioning of the bearing 18 and the relative positioning of the stub shaft 13 and whorl 15.

Within the interior of the whorl 15, and at the upper end of the stub shaft 13, an upper ball bearing 23 is provided. The ball bearing 23 is also of the permanently lubricated and sealed type. The bearing 23 is preferably of smaller size than the bearing 18 to permit of the ready insertion thereof, upon assembly, into the interior space in the whorl 15. The bearing 23 has its outer race spaced inwardly from the interior surface 17 and its inner race is in engagement with a portion 22 on the stub shaft 13 of reduced diameter and may be held in position by a lock ring 29.

Interposed between the interior surface 17 of the whorl 15 and the outer race of the ball bearing 23, a collar or boot 24 is provided having an upper inwardly extending flange 25 and a lower inwardly extending flange 26 for retaining the same in position during assembly and in use. The boot or collar 24 may be made of any desired material having sufficient resilience and, for this purpose, it is preferred to employ rubber, either natural or synthetic.

The diameter of the exterior face of the boot or collar 24 is preferably the same as the diameter of the outer race of the bearing 18. The upper flange 25 preferably abuts against shoulder 27 in the interior of the whorl 15.

The mode of operation will now be pointed out.

With the spindle mounted on a rail or other mounting in the customary manner and with a belt (not shown) in engagement with the whorl 15, the whorl is rotated. The lower ball bearing 18, while permitting a relatively limited movement other than rotation, is substantially free from appreciable non-rotary movement. The upper bearing 23, by reason of the resilience of the collar or boot 24, permits of a slight non-rotary movement of the whorl 15 and the spindle blade 14 carried thereby greater than that of the normal clearance of the bearing. The "loose" fit up of the bearing 18 prevents binding of the bearing 18 upon such movement. The spindle blade 14 tends, however, to rotate in an aligned position and the collar or boot 24, in addition to its function of maintaining alignment, seems to have a damping action which reduces the tendency of the spindle blade 14 to vibrate.

The use of permanently lubricated bearings in this assembled relationship obviates the necessity for supplying lubricant, and prevents the undesired escape of lubricant so that discoloration and soiling of the yarn by lubricant are avoided.

By removing the ring 20 the whorl 15 can be raised and removed for inspection of the bearings 18 and 23.

I claim:

1. A spindle mounting comprising a support, a stub shaft fixedly mounted with respect to said support, vertically spaced bearings mounted on said shaft, a whorl having a spindle blade carried thereby and having a sleeve enclosing said bearings, and a resilient ring interposed between the interior of said sleeve and the outer race of the upper of said bearings.

2. A spindle mounting comprising a support, a stub shaft fixedly mounted with respect to said support and having spaced upper and lower sections of different diameters, upper and lower spaced bearings having their inner races in engagement with said sections, a whorl having a spindle blade carried thereby and having a downwardly extending sleeve portion enclosing said bearings, the outer race of the lower one of said bearings being in engagement with the interior of said sleeve, and a resilient ring interposed between said sleeve portion and the outer race of the upper one of said bearings.

3. A spindle mounting comprising a support, a stub shaft fixedly mounted with respect to said support, upper and lower spaced ball bearings mounted on said stub shaft, a whorl having a spindle blade carried thereby and having a portion enclosing said bearings, an abutment in the interior of said whorl with which the outer race of the lower of said bearings is in engagement, and a resilient ring interposed between said whorl and the outer race of the upper one of said bearings.

4. A spindle mounting comprising a support, a stub shaft fixedly mounted with respect to said support, vertically spaced bearings mounted on said shaft, a whorl having a spindle blade carried thereby and having a sleeve enclosing said bearings, a resilient ring interposed between the interior of said sleeve and the outer race of the upper of said bearings, the interior of the sleeve having an abutment for engagement by said resilient ring.

5. A spindle mounting comprising a support, a stub shaft fixedly mounted with respect to said support and having spaced upper and lower sections of different diameters, upper and lower spaced bearings having their inner races in engagement with said sections, locking members for holding said inner races in position, a whorl having a spindle blade carried thereby and having a downwardly extending sleeve portion enclosing said bearings, the interior of the sleeve portion having an upper abutment, a resilient ring interposed between the whorl and the upper end of the outer race of the upper bearing and in engagement with said abutment, and a lower abutment carried by said whorl and in engagement with the lower end of the outer race of the lower bearing.

WALTER WARREN EGEE.

REFERENCES CITED

The following references are of record in the file of this patent:

UNITED STATES PATENTS

| Number | Name | Date |
|---|---|---|
| 2,068,652 | Brull | Jan. 26, 1937 |
| 2,149,122 | McCall | Feb. 28, 1939 |
| 2,173,250 | Fay | Sept. 19, 1939 |
| 2,479,168 | Keene et al. | Aug. 16, 1949 |